United States Patent [19]

Masaka

[11] 4,299,544
[45] Nov. 10, 1981

[54] ELECTROMAGNETIC PUMPS

[75] Inventor: Mitusuke Masaka, Kawagoe, Japan

[73] Assignee: Jidosha Kiki Co., Ltd., Tokyo, Japan

[21] Appl. No.: 46,893

[22] Filed: Jun. 8, 1979

[30] Foreign Application Priority Data

Jul. 13, 1978 [JP] Japan .................... 53-95671[U]

[51] Int. Cl.³ ............................................. F04B 17/04
[52] U.S. Cl. .................................................. 417/417
[58] Field of Search ............... 417/417, 416, 415;
310/68, 64, 65

[56] References Cited

U.S. PATENT DOCUMENTS

| | | | |
|---|---|---|---|
| 3,113,523 | 12/1963 | Woodward | 417/417 |
| 3,400,663 | 9/1968 | Wertheimer | 417/417 |
| 3,492,619 | 1/1970 | Hager | 337/276 |
| 3,979,659 | 9/1976 | Lynch | 310/68 |
| 4,042,955 | 8/1977 | Imai | 357/72 |
| 4,047,852 | 9/1977 | O'Connor | 417/417 |
| 4,080,552 | 3/1978 | Brown | 417/417 |
| 4,101,950 | 7/1978 | Hager | 417/417 |
| 4,169,696 | 10/1979 | Brown | 417/417 |

Primary Examiner—William L. Freeh
Assistant Examiner—Edward Look
Attorney, Agent, or Firm—Townsend and Townsend

[57] ABSTRACT

In an electromagnetic pump wherein a plunger is reciprocated in a cylinder by an exciting coil energized by interrupted current from an oscillator, an insulating layer is coated on the outer surface of the coil and a space between the coil and a cover is filled with polyurethane foam.

7 Claims, 5 Drawing Figures

ELECTROMAGNETIC PUMPS

BACKGROUND OF THE INVENTION

This invention relates to an electromagnetic pump of the type utilized to feed fuel to a motor car engine.

A prior art electromagnetic pump of the type referred to above comprises a vessel made up of a U shaped yoke made of such magnetic material as iron and steel, and a U shaped housing adapted to cover the opening of the yoke. Mechanical and electrical component elements of the pump are disposed in the pump vessel. One example of such electromagnetic pump is disclosed in U.S. Pat. No. 3,400,663. An electromagnetic pump disclosed in this U.S. patent comprises a yoke having opposed legs, and a non-magnetic sleeve containing a movable member of the pump, that is a plunger, which extends through openings of the legs, the opposite ends of the sleeve being supported by inlet and outlet fixtures threaded in respective openings. A bobbin wound with an exciting coil is received in a space between the two legs of the yoke to surround the sleeve with the exciting coil. On one side of the bobbin is disposed a printed circuit board containing such electronic component parts as resistors and diodes which constitute an oscillator together with a transistor. The transistor is mounted on the outside of the housing and connected to the printed circuit board by wires extending through openings of the housing. The oscillator supplies pulsating current to the exciting coil. The plunger is reciprocated in the plunger by the electromagnetic force created by the exciting coil and a return spring so as to feed fluid from an inlet passage in the inlet fixture to an outlet passage in the outlet fixture.

In most cases, since such an electromagnetic pump is mounted on the outside of a car body, particularly beneath its floor, the transistor mounted on the outside of the housing is often damaged by flying stones when the vehicle is in motion. Furthermore, water and mud accumulate on the electromagnetic pump and enter into the inside thereof through a joint between the yoke and the housing or openings for connecting the transistor, thus damaging various component parts. In extremely cold areas, rock salt is sprinkled on roads for the purpose of preventing freezing. When a motor car runs on such roads, a powder of rock salt is deposited on the electromagnetic pump whereby brine enters into the interior of the electromagnetic pump to electrolytically etch such conductive parts as terminals of circuit elements and copper wires of the coil which are at different potentials, thereby causing incomplete contact or breakage of the wire. Moreover, as a grounding lead wire extending from the inside of the electromagnetic pump is mounted on the transistor by a screw, these portions are particularly damaged.

For this reason, in a prior art electromagnetic pump a sealing agent was applied to gaps on the outside, for example a joint between the yoke and the housing, and a joint between the transistor and the housing, for preventing water and brine from entering into the electromagnetic pump. However, since there are many portions at which the sealing agent must be coated all around the electromagnetic pump and since it is difficult to apply the sealing agent to stepped portions, the coating operation is not only troublesome but also requires large labor and time factors and a large quantity of the sealing agent.

Another approach to this problem is disclosed in U.S. Pat. No. 3,492,619 in which a foamed material, for example, polyurethane foam is filled in an electromagnetic pump for the purpose of sealing the same. However, certain foamed material can not completely fill the interior of the pump, or does not adhere well to plastics so that it peels off. Thus, when the foamed material fails to completely fill the pump, voids exist which result in the undesired electrolytic etching noted above. Moreover, the adhesion of the foamed material to component elements of the pump is poor, thus causing the foam to peel off, resulting in electrolytic etching.

SUMMARY OF THE INVENTION

Accordingly, it is an object of this invention to provide an electromagnetic pump well sealed against invasion of foreign matter.

According to this invention, there is provided an elecgtromagnetic pump comprising a cylinder, a plunger contained in the cylinder to be movable in the axial direction, an electromagnetic coil disposed about the cylinder, the coil constituting an oscillator assembly together with a transistor, and a cover member including a magnetic member whereby the plunger is reciprocated by pulsating current suppled to the electromagnetic coil, characterized in that there are provided an insulating layer formed on the outer surface of the oscillator assembly, and a foamed member filled in a space in the cover member.

DESCRIPTION OF THE PREFERRED EMBODIMENTS

Figure 1:
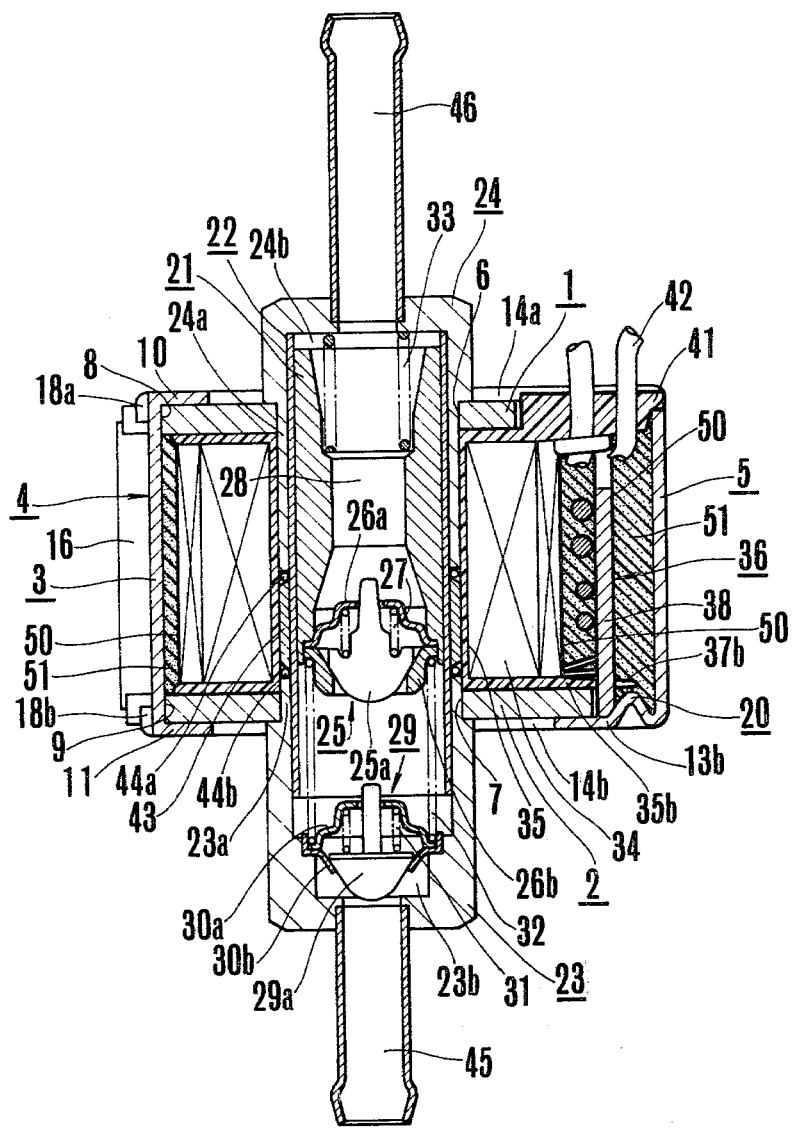
FIG. 1 is a longitudinal sectional view showing one embodiment of the electromagnetic pump of this invention.
Figure 2:
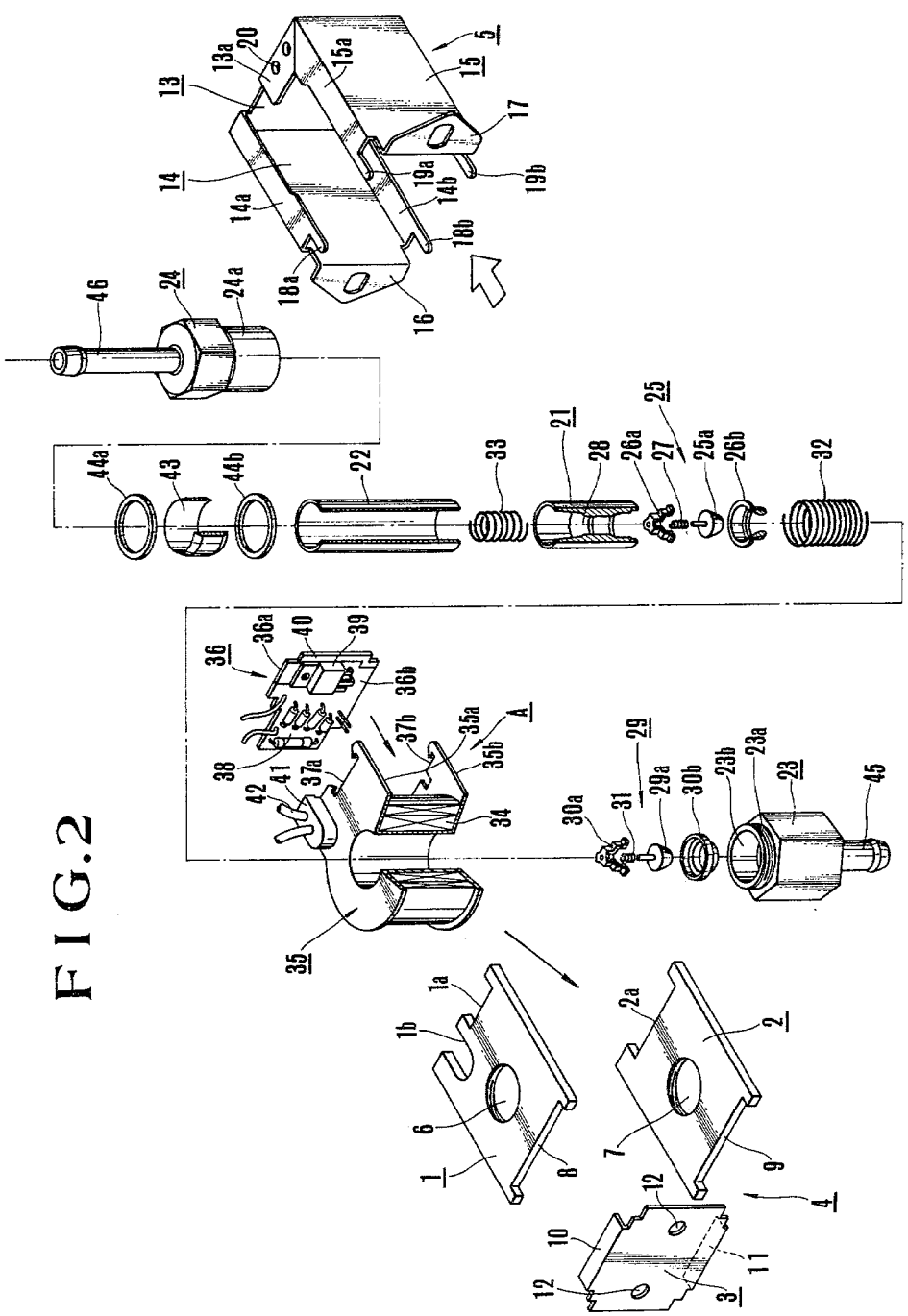
FIG. 2 is an exploded perspective view showing certain essential elements of the electromagnetic pump shown in FIG. 1.
Figure 3:
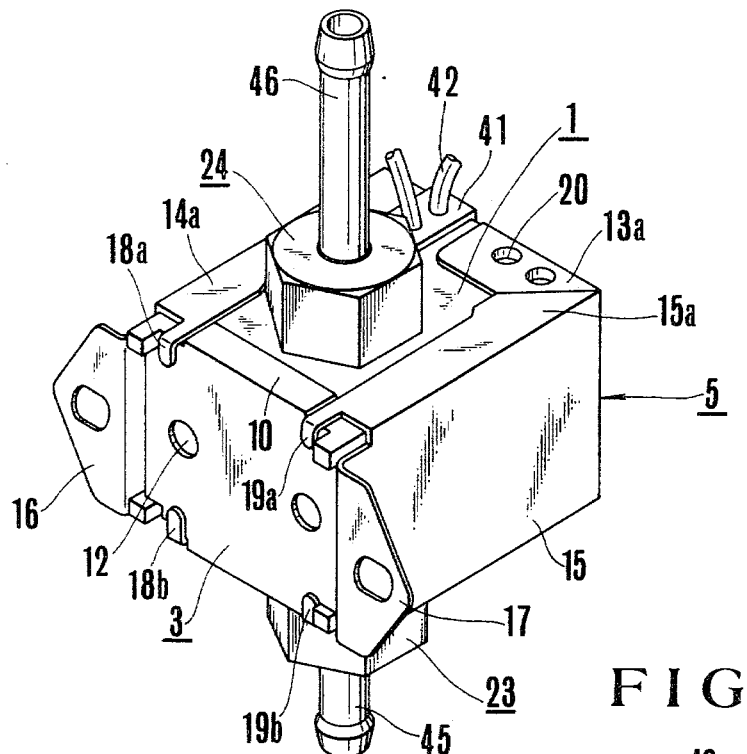
FIG. 3 is a perspective view showing the appearance of the electromagnetic pump shown in FIG. 1.

A preferred embodiment of an electromagnetic pump embodying the invention shown in FIGS. 1, 2 and 3 comprises a generally U shaped yoke member 4 including a pair of parallel spaced legs 1 and 2 and a connecting plate 3 which interconnects one end of the legs 1 and 2, and a housing member 5 bent into a U shape to close the opening of the yoke member 4. The yoke member 4 of the housing member 5 are combined so as to define a space for accommodating principal mechanical and electrical component elements of the pump.

As shown in FIG. 2, legs 1 and 2 and the connecting plate 3 comprise flat plates of magnetic material, for example iron and steel plates, which form a passage for magnetic flux for reciprocating a plunger to be described later. The legs 1 and 2 form a supporting frame adapted to support various component elements of the pump.

As shown in FIG. 2, each of the plates 1 and 2 has a relatively large thickness and takes the form of a rectangle. At the centers of the plates 1 and 2 are formed circular openings 6 and 7 of the same dimension. These openings oppose each other to respectively receive an inlet fixture and an outlet fixture as will be described later. The peripheries of these openings are provided with screw threads. The lefthand edges of the plates 1 and 2 are notched to form engaging portions 8 and 9 for receiving the connecting plate 3. On the opposite or right hand edge of the plate 1 are formed a rectangular notch 1a and an elliptical notch 1b. The second plate 2 is also formed with a rectangular notch 2a on the right hand edge.

The connecting plate 3 has a dimension determined by the width of the first and second plates and the spacing therebetween and its thickness is smaller than those of the first and second plates 1 and 3. Bent pieces 10 and 11 are formed on the upper and lower edges of the third or connecting plate 3 which oppose engaging portions 8 and 9. Thus the bent pieces 10 and 11 engage the plates 1 and 2 respectively so as to connect the connecting plate 3 to the plates 1 and 2. The upper and lower edges of the connecting plate 3 where bent pieces 10 and 11 are formed are stepped at both ends to engage the side edges the plates 1 and 2. The connecting plate 3 acts as a lid for the space defined by the plates 1, 2 and 3 and is provided with two openings 12 which are used to introduce into the space foaming material, for example polyurethane foam, to insulate electrical component elements as will be described later. In contrast to the first and second plates 1 and 2, which constitute a supporting frame, the connecting plate 3 is merely used to constitute the flux together with the plates 1 and 2 so that it is possible to arbitrary select its thickness.

The housing member 5 is combined with the yoke member 4 made up of three plates 1, 2 and 3 and bent into a U shape to cover the opening of the yoke member 4 as shown in FIG. 2. More particularly, the yoke housing member 5 comprises a bottom plate 13 and a pair of side plates 14 and 15. The free ends, or the opening ends of the side plates 14 and 15 are bent outwardly to form mounting brackets 16 and 17 for securing the electromagnetic pump to a car body, for example. Side edges 14a, 14b, 15a and 15b are bent inwardly to oppose each other, and the upper and lower edges 13a and 13b of the bottom plate 13 are also bent inwardly. Bent edges 13a, 14a, 15a and 13b, 14b and 15b are contained in the same planes to cover the peripheries of the upper and lower openings of the housing member 5. These bent edges also act as guides for the first and second plates 1 and 2 when they are inserted into the housing member 5 and clamp the upper and lower edges of the first and second plates 1 and 2 to prevent them from moving in the vertical direction. At the inner ends of the bent edges 14a, 14b, 15a and 15b are formed projecting tongues 18a, 18b, 19a and 19b. When these tongues are bent inwardly to engage the outer surface of the connecting plate 3 of the yoke 4, the yoke is secured to the housing member 5. The bent edges 13a and 13b of the bottom plate 13 are formed with a plurality of inward projections 20 (see FIG. 1) at points slightly spaced from the inner surface of the bottom plate 13. These projections 20 engage a printed circuit board supported by the yoke member 4 and incorporated with electronic components elements which constitute an oscillator so as to prevent the printed circuit board from contacting the inner surface of the bottom plate 13. A portion of the upper edge of the bottom plate 13 is notched to correspond to the elliptical notch 1b of the first plate 1.

The space defined by the yoke member 4 and the housing member 5 is used to accommodate principal elements of an electromagnetic pump which are shown in FIGS. 1 and 2. More particularly, a non-magnetic sleeve 22 containing a plunger 21 extends through the openings 6 and 7 of the first and second plates 1 and 2 of the yoke member 4 and the opposite ends of the sleeve 22 are fastened to the plates 1 and 2 by cup shaped portions 23a and 24a of an inlet fixture 23 and an outlet fixture 24 threaded into the openings 6 and 7 respectively. Beneath the plunger 21 contained in the sleeve 22 is provided a valve member 25a of a discharge valve 25 which is held by holders 26a and 26b and normally urged by a spring 27 to close the through opening 28 of the plunger 21. Inside of the cylindrical portion 23a of the inlet fixture 23 is contained a valve member 29a of a suction valve 29 which is supported by holders 30a and 30b and normally biased by a spring 31 to close an inlet passage 23b of the inlet fixture 23. A return spring 32 is provided in the sleeve 22 at a portion beneath plunger 21 for normally urging the plunger 21 against the outet fixture 24. A spring 33 is provided to absorb shocks created by the plunger 21 and acting upon the outlet fixture 24.

A bobbin 35 wound with an exciting coil 34 is contained in the space between the plates 1 and 2 of the yoke member 4 to surround the sleeve 22. Flanges 35a and 35b on the opposite sides of the bobbin extend beyond the plates 1 and 2 and are provided with notches 37a and 37b for mounting an oscillator 36. The oscillator 36 is used to supply pulsating current to the exciting coil 34 and constituted by such electronic component elements as resistors and diodes which are mounted on a printed circuit board 38, and a transistor 39 secured by screws to a heat radiating metal plate 40 coextensive with the printed circuit board 38. The metal plate 40 and the printed circuit board 38 are maintained in the same plane by the pins of the transistor 39.

Figure 4:
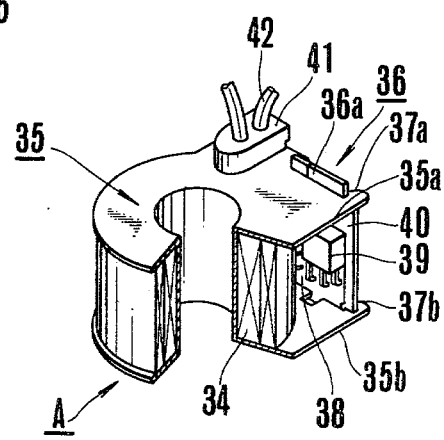
FIG. 4 is a perspective view, partly broken away, showing an oscillator assembly utilized in this invention.

As shown in FIG. 4, projections 36a and 36b formed on the upper and lower edges of the oscillator 36 are received by the notches 37a and 37b of the bobbin 35 thus completing an oscillator assembly A constituted by the exciting coil 34 and a printed circuit board 38 supporting electronic elements of the oscillator 36. The ends of the projections 36a and 36b are inserted into the notches 1a and 2a of the yoke plates 1 and 2 so as to interconnect them. The bobbin 35 is provided with an integral boss 41 which projects to the outside through the notch 1b of the plate 1 and a corresponding notch of the housing member 5. Lead wires 42 from the printed circuit board 38 extend through the boss 41.

A non-magnetic ring 43 and a pair of rubber rings 44a and 44b are contained in a space between the outer surface of the sleeve 22 and the inner surface of the central opening of the bobbin 35 for preventing leakage of fluid through contact portions between the sleeve 22 and fixtures 23 and 24. The inlet fixture 23 and the outlet fixture 24 are provided with pipes 45 and 46 respectively which are used to connect the inlet passage 23b and the outlet passage 24b of the fixtures 23 and 24 to the usual associated elements.

As above described, according to this invention, exciting coil 34 disposed in the space defined by the yoke member 4 and the housing member 5, and the printed circuit board 38 incorporated with the transistor 39 and the other electronic circuit elements that constitute oscillator 36 for producing pulsating cirrent, are incorporated into bobbin 35 to form the oscillator assembly A which is an essential element of the electromagnetic pump and must be insulated well. Thus, as shown in FIG. 1 a liquid insulating layer 50 is provided on the outer surface of the oscillator assembly A. The liquid insulating layer 50 can be formed by dipping the oscillator assembly A in an insulating liquid, for example a liquid silicone after sealing the central opening of the bobbin 35 with an adhesive tape. Thus, the electronic circuit elements incorporated into the oscillator assembly A are perfectly sealed and insulated by the insulating layer 50.

The space between the yoke member 4, the housing member 5 and the oscillator assembly A is filled with foamed material 51, for example polyurethane foam, which is injected through the opening 12 of the connecting plate 3 and then caused to foam for sealing and insulating the electromagnetic pump. Consequently, all portions of the electromagnetic pump are completely surrounded by the foamed member 51 thus preventing invasion of water or brine. In the illustrated embodiment, since the connecting plate 3 is provided with two openings 12, the foaming material may be introduced through either one of these openings. This eliminates any need for accurate positioning of the electromagnetic pump, thus simplifying the injection operation. When one opening is used for injection, the other opening may be used to observe the amount of the foaming material injected.

The above described electromagnetic pump can readily be assembled in the following manner. The oscillator assembly A coated with insulating layer 50 is clamped between the first and second plates 1 and 2 of the yoke, the sleeve 22 containing plunger 21 and the other elements is inserted through openings 6 and 7 and then inlet fixture 23 and the outlet fixture 24 are fastened to the plates 1 and 2 respectively. After mounting these essential elements, the bent pieces 10 and 11 of the connecting plate 3 are caused to engage the engaging portions 8 and 9 of the first and second plates 1 and 2 respectively, and then the resulting assembly is contained in the housing member 5. Thereafter, the projecting tongues 18a, 18b, 19a and 19b of the housing member 5 are bent at right angles to engage the outer surface of the connecting plate 3 thus securely interconnecting the yoke member 4 and the housing member 5. Then foaming material is injected into the housing member 5 through one of the openings 12 to form foamed member 51 thus completing the electromagnetic pump as shown in FIGS. 1 and 3.

In the electromagnetic pump assembled in this manner, since the inlet fixture 23 and the outlet fixture 24 adapted to hold the opposite ends of the sleeve 22 are secured to openings 6 and 7 of independent plates 1 and 2 of the yoke member 4, even when these openings are slightly misaligned, the sleeve will not be deformed as in the prior art. Such misalignment merely displaces slightly the plates 1 and 2 in the horizontal direction thus maintaining the sleeve and the fixtures 23 and 24 on the same axis. Relative displacement of plates 1 and 2 is readily absorbed when they are contained in the housing member 5. When the plates 1 and 2 are interconnected by the connecting member 3 and then contained in the housing member 5, the yoke member 4 and the essential elements of the electromagnetic pump are contained in the housing member 5 and the sleeve and the fixtures 23 and 24 are maintained in a precise coaxial relationship.

In the electromagnetic pump describe above, the plunger 21 is reciprocated in the sleeve 22 by the electromotive force created in the yoke member 4 by the pulsating current supplied to the exciting coil 34 from the oscillator 36 and the force of the return spring 32 thus ensuring stable operation of the pump.

The oscillator assembly A contained in the housing is perfectly sealed by the insulating layer 50 and the foamed material 51 whereby the assembly is maintained in a good insulated condition. In contrast to the prior art construction in which the transistor is mounted on the outside of the pump, according to this invention, the transistor is contained in the housing member as part of the oscillator assembly A. Thus when the pump is mounted on a motor car, for example, the working elements of the pump are protected against flying stones and against invasion of water, mud and brine. Although in the foregoing embodiment the insulating layer 50 is formed by dipping the coil assembly in a liquid insulator and foaming material is injected through one of the openings 12 of the connecting plate 3 to form the foamed element 51, the invention is not limited to these expedients and various materials can be used so long as it is possible to seal the pump and to protect the electrical component elements by an insulating layer 50 and a foamed element 51.

Furthermore, while in the foregoing embodiment non-magnetic ring 43 and the pair of rubber rings 44a and 44b are provided about the sleeve 22, and the discharge valve 25 is disposed beneath the plunger 21, the invention is not limited to this specific construction.

Figure 5:
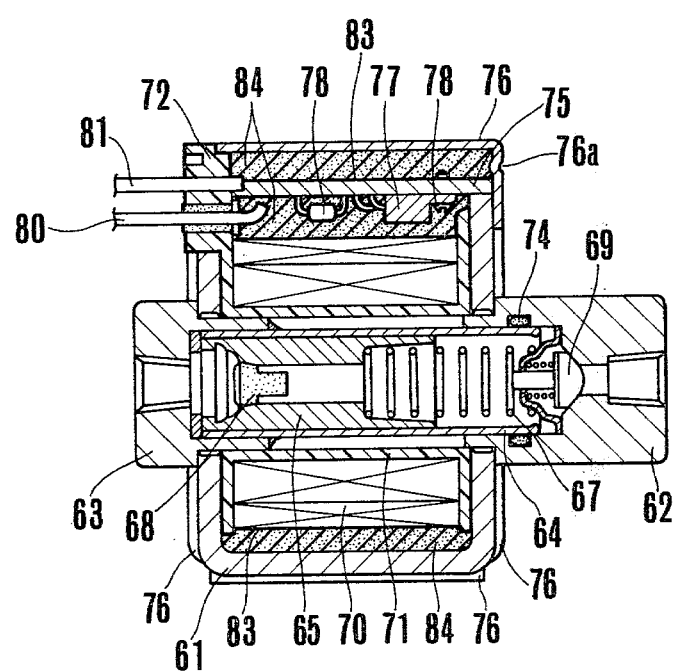
FIG. 5 is a longitudinal sectional view showing a modification of the electromagnetic pump according to this invention.

FIG. 5 shows a modified embodiment of this invention, which comprises a magnetic yoke 61 made of a relatively thick iron plate bent into a U shape and an inlet fixture 52 and an outlet fixture 63 which are coaxially mounted on the opposed legs.

A cylinder 64 made of non-magnetic material is coaxially clamped between the inlet fixture 62 and the outlet fixture 63 to contain a plunger 65 made of magnetic material to be slidable in the axial direction. The plunger 65 is normally biased to the discharge side by a return spring 67, and a discharge valve 68 is provided on the discharge side of the plunger 65, whereas a suction valve 69 is mounted in the inlet fixture 62. An electromagnetic coil 70 including an exciting coil and a sensing coil is wound about a bobbin 71 which surrounds the cylinder 64. A terminal boss 72 is formed integral with the bobbin 71 and an O-ring 74 is used to prevent leakage of fluid. A printed circuit board 75 is supported by an inward projection 76a of a cover 76 which is disposed at one end of the magnetic yoke 61 to cover the same. The printed circuit board 75 has the same construction as that of the previous embodiment and a molded type transistor 77 is secured to a metal plate by screws 78. Electronic circuit elements 78, for example resistors and diodes, are also mounted on the printed circuit board. The electromagnetic coil 70, transistor 77, electronic circuit elements 78, connections to lead wires 80, 81, etc. are all contained in a space bounded by the yoke 61 and the cover 76 and are not exposed.

In the same manner as in the previous embodiment, after closing the central opening of the bobbin 71, the printed substrate 75 and the coil 70 are dipped in a liquid insulator to form a liquid insulating layer 83 on the outer surface of the coil. The space between the coil, yoke 61 and cover 76 is filled with foamed material 84, for example polyurethane foam, to completely surround the component parts so as to prevent invasion of water and brine.

In the first embodiment, for the purpose of interconnecting the plates 1 and 2, connecting plate 3 an U shaped housing member 5, tongues 18a, 18b, 19a and 19b were provided for the housing member and were bent against the connecting plate 3. However, such tongues may be provided for the connecting plate 3 and bent to engage recesses of the housing member.

As above described, according to this invention, the yoke member is constituted by a pair of parallel plates or legs which support component elements of the pump and an oscillator assembly A and a connecting plate engaging one end of the legs, and a housing member is combined with the yoke member so as to close the opening of the yoke member.

Although in the first embodiment, bent brackets 16 and 17 adapted to secure the electromagnetic pump were formed at one end of the side plates 14 and 15 of the housing member 5, such connecting brackets may be provided for the opposite sides of the connecting plate.

The foamed element filled in the space between the pump assembly and the housing member completely seals and insulates the electrical component parts. This not only the troublesome operation of applying a sealing agent on the outside of the pump as in the prior art construction but also decreases the amount of the sealing agent required.

Furthermore as the prior art metal case type transistor is substituted by a resin mold type transistor, it is possible to reduce the manufacturing cost.

What is clamed is:

1. In an electromagnetic pump comprising a cylinder, an inlet valve means positioned adjacent one end of said cylinder, an outlet valve means positioned adjacent the other end of said cylinder, a plunger contained in the cylinder to be moveable in the axial direction, an electromagnetic coil disposed about said cylinder, said coil constituting an oscillator assembly together with a transistor, and a housing member including a magnetic yoke member, whereby the plunger is reciprocated by pulsating current supplied to said electromagnetic coil, the improvement which comprises an insulating layer formed on the outer surface of said oscillator assembly, and a foamed member filled in a space within said housing member, said housing member surrounding said oscillator assembly, said layer and said foamed member so that said oscillator assembly is completely isolated from environmental contaminants.

2. The invention according to claim 1 wherein said oscillator assembly comprises a printed circuit board which supports said transistor and component elements of an oscillator.

3. The invention according to claim 2 wherein said transistor is molded in resin.

4. The invention according to claim 3 wherein said transistor is mounted on a cooling metal plate positioned coplanar with said printed circuit board in edge-to-edge relation.

5. The invention according to claim 4 wherein said metal plate is in contact with and supported by a metal portion of said housing member.

6. In an electromagnetic pump in which an inlet fixture and an outlet fixture are disposed on the opposite ends of a non-magnetic sleeve, a plunger is contained within said sleeve to be moveable in the axial direction, an exciting coil is wound about the sleeve between the inlet and the outlet fixtures, a transistor is combined with said exciting coil to constitute an oscillator assembly so as to excite the exciting coil by pulsating current thus reciprocating the plunger in the sleeve, and a suction valve and a discharge valve are arranged in series with the sleeve, the improvement which comprises a U shaped yoke member including a pair of spaced legs which respectively support said inlet and outlet fixtures, and a connecting plate for interconnecting one end of said legs, a housing member combined with said yoke member to close an opening thereof, an insulating layer applied to the outer surface of said oscillator assembly disposed between said pair of legs, and a foamed member disposed in a space defined by said yoke member and said housing member, said oscillator assembly being positioned within said space, whereby said oscillator assembly is comletely isolated from environmental contaminants.

7. The electromagnetic pump according to claim 6 wherein said transistor is molded in resin.

* * * * *

UNITED STATES PATENT AND TRADEMARK OFFICE
CERTIFICATE OF CORRECTION

PATENT NO. : 4,299,544
DATED : November 10, 1981
INVENTOR(S) : Mitusuke Masaka, Kawagoe, Japan It is certified that error appears in the above-identified patent and that said Letters Patent are hereby corrected as shown below:

Column 2, line 19, correct spelling of "elecgtromagnetic" to --electromagnetic--.

Column 4, line 67, correct spelling of "cirrent" to --current--.

Column 6, line 1, correct spelling of "describe" to --described--.

Column 7, line 26, insert the word "eliminates" before the word 'the' and after the word 'only.'

Column 8, line 41, correct spelling of "comletely" to --completely--.

Signed and Sealed this

Ninth Day of February 1982

[SEAL]

Attest:

GERALD J. MOSSINGHOFF

*Attesting Officer*      *Commissioner of Patents and Trademarks*